United States Patent [19]

Woo et al.

[11] 4,119,599

[45] Oct. 10, 1978

[54] CATHODIC ELECTROCOATING COMPOSITIONS CONTAINING ACID-FUNCTIONAL AMINOPLAST AND FLEXIBILIZED, EPOXY-FREE, AMINATED RESIN

[75] Inventors: James T. K. Woo, Medina, Ohio; James M. Evans, Lynn Haven, Fla.

[73] Assignee: SCM Corporation, Cleveland, Ohio

[21] Appl. No.: 813,082

[22] Filed: Jul. 5, 1977

Related U.S. Application Data

[62] Division of Ser. No. 642,694, Dec. 22, 1975, Pat. No. 4,066,525.

[51] Int. Cl.$^2$ ............................................. C08L 61/28
[52] U.S. Cl. .......................... 260/29.4 R; 204/181 C; 260/834; 428/418; 428/460
[58] Field of Search ................... 260/29.4 R, 29.2 EP, 260/834, 849, 850; 204/181, 856

[56] References Cited

U.S. PATENT DOCUMENTS

| | | | |
|---|---|---|---|
| 3,464,946 | 9/1969 | Downing | 260/29.4 R |
| 3,471,388 | 10/1969 | Koral | 204/181 |
| 3,519,627 | 7/1970 | Coats et al. | 260/75 N |
| 3,891,527 | 6/1975 | Sekmakas | 204/181 |
| 3,965,058 | 6/1976 | Yurcheshen | 260/21 |

*Primary Examiner*—Theodore E. Pertilla
*Attorney, Agent, or Firm*—Merton H. Douthitt

[57] ABSTRACT

Heat cured coatings cathodically electrodeposited from an aqueous dispersion of (a) an ionized reaction product of an epoxy resin and a monoamino alcohol or phenol, said reaction product also having a pendant hydrocarbon group, (b) an acid-functional aminoplast resin, and (c) a water soluble acid solubilizer, where the dispersion is free from water soluble acid which will be retained in the heat cured resinous coating are found to provide exceptional resistance to corrosion of ferrous metal substrates upon exposure to salt spray or detergent solutions.

7 Claims, No Drawings

CATHODIC ELECTROCOATING COMPOSITIONS CONTAINING ACID-FUNCTIONAL AMINOPLAST AND FLEXIBILIZED, EPOXY-FREE, AMINATED RESIN

This is a division, of application Ser. No. 642,694, filed Dec. 22, 1975 now U.S. Pat. No. 4,066,525.

BACKGROUND OF THE INVENTION

In the electrocoating art an organic coating, i.e., a coating comprising a resinous organic binder and optionally containing other conventional coating components such as pigments, extenders, cross-linking agents, mildeweides, etc., is formed upon an electrically conductive workpiece by electrodeposition from a liquid (usually aqueous) dispersion. Following electrodeposition of the coating material onto the workpiece-electrode, the workpiece is removed from contact with the liquid electrocoating dispersion, rinsed to remove adhering portions of that liquid dispersion and, usually, subjected to a curing operation to crosslink the electrodeposited binder resin so as to convert the coating on the workpiece to an insoluble, hard, adherent, protective film.

The liquid dispersion contains an ionized form of the binder resin dispersed in the liquid medium together with the other components of the coating to be deposited and also contains a counter-ion soluble in the liquid dispersion medium. The ionized resin may be either truly dissolved or merely finely dispersed as an emulsion or a colloidal dispersion in the liquid dispersion medium. It is preferred that the counter-ion be truly dissolved in the liquid dispersion medium, as this will lead to the greatest stability of the dispersion of the ionized resin species. The electrically conductive workpiece to be electrocoated is connected through a suitable external circuit including a direct current emf source to a counter-electrode and both workpiece and counter-electrode are brought into contact with a body of the liquid dispersion. When the emf source in the external circuit is energized so as to charge the workpiece-electrode (relative to the counter-electrode) to a polarity opposite to the charge carried by the ionized binder resin in the liquid dispersion, then that ionized binder resin will electrophoretically migrate toward the workpiece-electrode and, if the voltage is great enough, will electrodeposit thereon by electrical neutralization in the vicinity of the workpiece-dispersion interface. It is found that by suitable selection of materials, the other optional and un-ionized components of the dispersion can be carried into the coating thus formed on the workpiece electrode.

In anodic electrocoating the workpiece-electrode is given a positive electrical charge relative to the counter-electrode and the binder resin contains groups ionizable to form anions. These are most often carboxylic acid groups and they are ionized by adding to the dispersion a base, such as an alkali or an amine, soluble in the dispersion medium. In cathodic electrocoating the resinous binder contains groups capable of ionizing to form cations and the actual degree of ionization of these groups in the dispersion is enhanced by the incorporation in the dispersion of material ionizable to form anions soluble in the liquid medium. Ordinarily the ionizable groups on the resinous binder are amine groups and the ionizing material is an acid which forms water soluble anions.

The emf source in the external circuit is used to charge the workpiece electrode as an anode or a cathode relative to the counter-electrode while both are in contact with a body of the liquid dispersion. The ionized resinous binder in the dispersion is electrophoretically attracted toward the workpiece-electrode and deposited thereon by electrical neutralization at the electrode-dispersion interface, while the counter-ions are simultaneously electrophoretically repelled therefrom, although a small proportion of the counter-ion or at least of counter-ion generating species is known to sometimes deposit on the workpiece electrode nonetheless. Other conventional coating components may be present in the liquid dispersion and, if suitably selected, will be co-deposited with the electrically neutralized form of the ionized resin upon the workpiece electrode to form the coating thereon, even though in the dispersion these other optional components are now known to bear charges. The mechanisms by which these other components are deposited as part of the coating are not fully understood, but in some cases such co-deposition may arise because the component is soluble the ionized binder resin which is itself present as a finely dispersed second phase rather than as a true solution in the aqueous medium. In other cases the ionized binder resin may attach by absorption to the other component, thereby conferring electrophoretic responsiveness upon an otherwise uncharged species.

A wide variety of resin types can be used as the binder component in electrocoating compositions for either anodic or cathodic deposition, so long as they contain a sufficient number of ionizable groups of the appropriate polarity, namely anionic for anodic deposition and cationic for cathodic deposition, to impart a useful degree of electrophoretic mobility.

The cure of organic coatings containing resinous binders having active hydrogens by thermally induced cross-linking reaction with aminoplast resins is well known. The active hydrogens in the binder resin to be cross-linked are typically provided by incorporating hydroxyl, carboxyl, or primary amide groups in that resin. In other respects the composition of the binder resin is almost unrestricted, insofar as curability is concerned, so long as a reasonable intimacy of admixture with the aminoplast resin can be achieved. Thus curing with aminoplast resins may be used in a wide variety of coating compositions wherein the binder resin may be selected from a wide range of compositions on the basis of availability, cost, application properties, and performance properties of the final cured coating. Typical resins for use in coating compositions to be cured with aminoplast resins include epoxies, polyesters, alkyds, (especially maleinized alkyds), acid- or amide-functional acrylics, and many others.

Aminoplast resins useful for curing organic coatings by cross-linking the binder resins of such coatings to form insoluble, high molecular weight materials having a wide range of properties, depending on the type of resinous binder, the type of aminoplast resin, their relative amounts, the other components of the coating composition, the conditions under which cure is achieved, etc., are well known in the coatings art. Typical aminoplast resins for such purposes are derived from polyfunctional amines or amides by reaction with formaldehyde. Among the more important aminoplast resins used in the organic coatings art are reaction products of formaldehyde with urea or with aminotriazines, such as melamine or benzoguanamine, and low molecular weight polymers thereof, and ethers of any of these with lower alkanols, especially methanol where it is desired to enhance water solubility and butanol where it is desired to suppress water solubility.

While the conditions of temperature and time required for cure of any particular coating composition by reaction of an aminoplast resin component with a resin component having active hydrogens will vary somewhat depending upon the particular chemical structures and concentrations involved, it is widely recognized that incorporation of acids in such compositions will tend to reduce the temperature and/or the time required to achieve cure as compared to the same composition in the absence of such acids. In general, the stronger the acid, and the higher its concentration in the coating, the greater will be the reduction in the temperature and/or time required for cure.

Aminoplast resins have been used to cure coatings electrodeposited upon an anode from an aqueous dispersion of the aminoplast resin and an anionic form of a binder resin containing active hydrogens. Dispersion of the anionic resin in the aqueous medium is ordinarily stabilized by the presence of a water soluble cation derived from an added base, such as an amine or alkali. The anions on the resin in the aqueous dispersion are usually deprotonated carboxyl groups and it is thought that the carboxylic acid groups are regenerated therefrom by electrical neutralization at the anode during electrodeposition of the coating. These carboxylic acid groups are then perforce available to catalyze the curing reaction between the binder resin and the aminoplast resin co-deposited therewith upon the anode when that coating is subsequently baked. The cure reaction may, of course, involve reaction of the acid groups themselves or of other active hydrogen-bearing groups on the binder resin or both with the aminoplast resin.

An improvement in the anodic electrocoating art, wherein the aminoplast resin also has ionizable carboxylic acid groups, has been described by Coates et. al. in U.S. Pat. No. 3,519,627 granted July 7, 1970. The entire disclosure of this patent is incorporated herein by reference. Coates et. al. therein teach the method of preparation and the usefulness in anodic electrocoating compositions of a certain class of carboxyl-containing ethers of aminotriazine/aldehyde condensates derived from hydroxy alkyl carboxylic acids, in particular carboxyl-containing ethers of fully methylolated melamine and benzoguanamine and low polymers thereof. Their utility in (anodic) electrocoating compositions is ascribed to the fact that the carboxyl groups thereon will be ionizable in the aqueous electrocoating dispersion under the same conditions as the carboxyl groups on the binder resin and therefore will co-deposit more effectively with that resin upon an anode in contact with the dispersion. Since there would be numerous carboxylic acid groups on the binder resin electrodeposited on the anode, any enhancement of the acid catalysis of the curing reaction between the aminoplast resin and the binder resin by virtue of the small proportion of additional carboxylic acid groups present on the aminoplast resin would be expected to be hardly noticeable and was not mentioned by Coats et. al.

The use of aminoplast curing resin compositions in cathodic electrocoating wherein a coating is electrodeposited upon a cathode in contact with an aqueous dispersion of a cationic form of a binder resin stabilized by the presence of water soluble anion and also containing an aminoplast resin, is also known. Thus, Koral in U.S. Pat. No. 3,471,388 granted Oct. 7, 1969, the entire disclosure of which is incorporated herein by reference, discloses how to make and to use in both anodic and cathodic electrocoating processes melamine resins comprising a certain class of etherified methylolated melamine. The patent contains no suggestion of the existence or utility of acid-functional aminoplast resins, and in particular contains no suggestion of their utility in cathodic electrocoating.

A water soluble alkanolamine-terminated epoxy resin was disclosed by Wong et. al. in U.S. Pat. No. 3,336,253. It differs from the binder resins of the present invention in being expressly restricted to a single alkanolamine termined group and in not being substantially free of epoxide functionality and there is no suggestion of its use in electrocoating.

SUMMARY OF THE INVENTION

The compositions of the present invention are cathodic electrocoating compositions comprising in aqueous dispersion:

(a) a cathodically electrodepositable, at least partially cationized binder resin comprising a major proportion of a reaction product of an epoxide-functional resin and a monoamino alcohol or phenol having at least one reactive hydrogen on the amino nitrogen, said reaction product being substantially devoid of reactive epoxide groups and having an average of at least about two reactive hydroxyl groups and at least about ½ directly or indirectly pendant 5 to 20 carbon atom hydrocarbon radical per molecule;

(b) from about 0.05 to about 1 weight parts, per weight part of said binder resin, of an acid-functional aminoplast resin (i) cathodically co-electrodepositable with said binder resin from said aqueous dispersion to form an intermediate product comprising an intimate mixture of the cathodically electrodeposited form of said binder resin and said aminoplast resin, (ii) co-reactive in said intermediate product with the cathodically electrodeposited form of said binder resin, upon heating, to transform said intermediate product into a cured resinous product, (iii) having at least about 0.0001 equivalent of titratable acid functionality of $pK_a$ not greater than about 5 per gram of said aminoplast resin, and (iv) not soluble independently in the aqueous medium of said dispersion; and (c) from about 20 to about 150 milliequivalents, per 100 grams of (a) and (b), of an anion of a water-soluble acid to enhance and stabilize the cationization of said binder resin;

said aqueous dispersion having a pH of from about 2 to about 7 and being substantially free of any water-soluble acid which will be retained in water-soluble form in said cured resinous product and of anions thereof. Compositions containing partially pre-reacted forms of components (a) and (b) wherein portion of the aminoplast resin is chemically bonded to the binder resin without exhausting their mutual reactivity are included among the compositions of the present invention and, where a major proportion of the aminoplast resin is thus chemically bonded to the binder resin, comprise a preferred embodiment.

The processes of the present invention are processes for cathodically electrocoating metallic substrates to form a cured resinous coating thereon, comprising (A) establishing simultaneous contact of said metallic substrate and a counter-electrode with a body of the liquid aqueous disperson of the above-described cathodic electrocoating composition;

(B) maintaining an electrical potential difference between said metallic substrate and said counter-electrode, while both are in contact with said body of liquid aqueous dispersion, of such polarity that said metallic substrate is charged as a cathode relative to said counter-electrode as an anode and of such magnitude that an uncured coating comprising said intermediate product is cathodically electrodeposited upon said metallic substrate;

(C) removing said metallic substrate bearing said uncured coating thereon from contact with said body of liquid aqueous dispersion; and (D) thereafter heating said uncured coating to transform it into a cured resinous coating comprising said cured resinous product.

DETAILED DESCRIPTION OF THE INVENTION

The present invention derives from the discovery that certain highly desirable properties in cathodically electrodeposited coatings can be attained by utilizing a particular class of binder resins capable of being cured by reaction with an aminoplast resin, dispersing the binder resin in the liquid electrocoating bath in cationic form, and providing for catalyzed cure of the coating cathodically electrodeposited therefrom by also dispersing in the liquid electrocoating bath an aminoplast resin having acid groups effective for catalyzing the cure reaction chemically bonded thereto, while excluding from the electrocoating bath composition any acids which will deposit as part of the coating on a workpiece-cathode and be retained therein to any significant extent in water-soluble form as the coating is heated to effect cure thereof. Since it is not known how to totally prevent the acid used to ionize the resinous binder from depositing to some extent with the coating on the cathode and since it appears to be uneconomical to completely wash out co-deposited water-soluble acid by rinsing or extraction of the coated workpiece the desired exclusion of such acids from the final product coating film can be achieved by restricting the water-soluble acids employed in the cathodic electrocoating composition to those which will volatilize or decompose upon heating the deposited coating to effect cure or which will react during cure with other components of the coating so as to become water-insoluble even though retained in the film. The presence of the acid groups attached to the aminoplast resin permits the advantages of acid catalysis of the aminoplast curing reaction to be realized, while the exclusion of water-soluble acids which will be retained in water soluble form in the final cured coating substantially reduces the water sensitivity of the final cured coating film and the consequent susceptibility of the substrate workpiece to corrosion upon exposure to water- or moisture-containing corrosive environments. Carboxyl-containing etherified aminotriazine-formaldehyde condensates, including low polymers thereof, are found to be particularly useful aminoplast resins in this invention. It is especially preferred to partially react the acid-containing aminoplast resin with the binder resin before electrodeposition of the coating, thereby improving both the stability of the liquid electrocoating dispersion and the intimacy and uniformity of distribution of the acid-functional aminoplast resin in the deposited coating, so long as this pre-reaction is stopped short of gelation and does not exhaust the mutual reactivity of the resins. Although the binder resin and the aminoplast resin of the present invention are usually referred to herein as separate and distinct components of the liquid electrocoating dispersion and of the uncured coating electrodeposited therefrom, it is intended throughout the description of the present invention, except where clearly indicated to the contrary, to include such partially pre-reacted compositions.

The epoxy binder resins of the present invention are derived from conventional di- or poly-epoxide functional epoxy resins of the bisphenol/epichlorohydrin type. At least one of the epoxide groups is reacted with a monoamino alcohol or phenol having at least one reactive hydrogen on the amino nitrogen. The epoxy resin is also modified by attaching to at least about 20% of the molecules thereof a directly or indirectly pendant hydrocarbon radical having from about 5 to about 20 carbon atoms. These pendant hydrocarbon radicals may be aliphatic, cycloaliphatic, or aromatic, but preferably comprise one or more terminal alkyl groups having at least about 5 carbon atoms. These hydrocarbon radicals may be attached to the epoxide resin by any convenient means, such as esterification of a suitable acid or anhydride by reaction with either an epoxide group or a hydroxyl group of the epoxy resin but are preferably attached by ether linkages formed between a suitable alcohol or phenol and an epoxide or hydroxyl group of the epoxy resin. To produce a cured coating with superior resistance to detergent solutions, the required hydrocarbon group must not be susceptible to hydrolysis and should either be attached by an ether linkages or, if by an ester linkage, the acid reactant should have its carboxyl group on a tertiary carbon atom, for example versatic acid. The resulting binder resin should contain at least about 2 reactive hydroxyl groups per molecule, which will ordinarily and preferably be residual hydroxyl groups produced in the condensation of the epichlorohydrin with the bisphenol to form the epoxy resin and not subsequently used up in attaching the required hydrocarbon radicals. For best results it is important that substantially all of the epoxide groups of the epoxy resin be consumed by reaction with an alcohol, an amine, a carboxylic acid or other suitable reactant so that the binder resin is substantially free of reactive epoxide groups in order that the amine-functional epoxy resin will have the desired superior stability in storage and use against premature further polymerization, cross-linking, or gelation. The preferred binder resins are those in which a minor proportion of the epoxide groups are not reacted with the monoamino alcohol or phenol, but are instead consumed by reaction with a suitable reactant such as an alcohol or alkyl phenol to introduce the required pendant hydrocarbon radical.

A particularly preferred binder resin is derived from a conventional bisphenol A/epichlorohydrin diepoxide epoxy resin having a molecular weight of about 1050 and available from the Dow Chemical Company under the designation DER-661. About 75% of the epoxide groups are reacted with diethanol amine and substantially all of the remaining epoxide groups are reacted with nonylphenol to introduce the required pendant hydrocarbon groups.

The aminoplast resin may comprise any of a broad range of etherified amine-aldehyde or amide-aldehyde condensates containing a plurality of ether groups reactive with groups containing active hydrogen such as hydroxyl, carboxyl and amide groups on the binder resin upon heating. While aminoplast resins derived from urea-formaldehyde condensates will work in the present invention, those derived from aminotriazine-formaldehyde condensates such as tetramethylol benzoguanamine and hexamethylol melamine are preferred. The amine-aldehyde condensate should be substantially fully etherified with a mixture of a lower alkanol and a hydroxy acid to form the acid functional aminoplast resin to be used in the invention. This may be accomplished by first substantially fully etherifying with a lower alkanol and then partially transetherifying that reaction product with the hydroxy acid to produce an etherified aminoplast resin having an acid number of at least 5, 6.

The acid used must have a pKa not greater than about 5 in order to be effective as a catalyst for the cure reaction between the binder resin having active hydrogens and the aminoplast resin. It is found that carboxylic acid groups are generally effective, but aromatic carboxylic acid groups are preferred. Other stronger acids such as sulfonic acids may also be used and will produce a greater catalytic effect on the curing reaction.

Since the aminoplast resins are dispersed in an acid medium to form the electrocoating compositions of the present invention and since it is known that such conditions are conducive to reaction and ultimately gelation of the aminoplast resin, it is desirable to reduce the water solubility of the aminoplast resin so as to decrease its susceptibility to premature reaction and gelation. This can be achieved by etherifying (or transetherifying) the methylol groups with alcohols having a relatively hydrophobic group attached to the alcoholic hydroxyl group. Ordinarily it is found convenient to adjust the hydrophobicity by producing a suitable mixture of methyl and butyl or isobutyl ether groups. In such cases the greatest hydrophobicity, and consequently the greatest stability against premature reaction and gelation in the aqueous dispersion, will be achieved with all butyl or isobutyl ether groups. But since the curing reaction is slower with butyl than with methyl ether groups on the aminoplast resin, it is not always desirable or necessary to shift the butyl/methyl ratio to give maximum hydrophobicity so long as sufficient bath stability for the particular composition and process is achieved. Similar considerations apply where ether groups derived from other alcohols are employed. Of course, the effect on aqueous solubility of the acid-bearing group must also be accommodated in adjusting the set-off between (i) increasing hydrophobicity and bath stability by incorporating a greater proportion of more hydrophobic ether groups and (ii) increasing the rate of the curing reaction in the deposited film by increasing the proportion of ether groups which decompose to liberate more volatile alcohols. It is found, however, that the acid groups, and particularly aromatic carboxylic acid groups, incorporated in the aminoplast resin itself do not produce premature reaction and gelation of the aminoplast resin and consequently the reciprocal adjustment of bath stability and cure speed is not adversely affected by the incorporation of such acid groups except insofar as the aqueous solubility is affected.

Several examples of preferred embodiments will be given. Except where clearly indicated otherwise, parts and percentages are by weight. Where epoxy or oxirane values or numbers are referred to, they may be determined by the method of Jay, Analytical Chemistry, vol. 36, 667-8 (1964), incorporated hereinby reference.

EXAMPLE I

A suitable and preferred binder resin for practice of the present invention can be prepared by charging to a suitable reactor vessel 96.4 parts of diethanol amine and heating to about 130° C. Over a period of about 2 hours, 857.2 parts of a 75% solution in xylene of a low molecular weight epoxide-functional epoxy resin derived from bisphenol-A and epichlorohydrin is added to the reaction vessel while maintaining the temperature at approximately 130° C. and returning refluxing xylene to the reacting mixture. A suitable epoxy resin is the Dow Chemical Company product designated D.E.R. 671 which has a molecular weight of about 1050 and an epoxide equivalent weight of about 525. The above reaction conditions are maintained for about an additional hour, at which time 60.6 parts of nonylphenol are added over a period of about 10 minutes and the same reaction conditions are maintained until the epoxide (oxirane) number is reduced to about 0, a period of about two to three hours. While the temperature is gradually raised from about 130° C. to about 160° C. over a period of about 1 to 2 hours, about 190 parts of xylene are removed from the reaction mixture by distillation under vacuum. The temperature of the reaction mixture is then lowered to about 125° C. and there is added 395.4 parts of an approximately 85% solution in isobutanol of an acid-functional aminoplast resin such as the American Cyanamid product designated CLA-66 which is a substantially fully etherified hexamethylol melamine etherified with lower alkanol and hydroxy aromatic carboxylic acid and has an acid number of about 19.6. This reaction mixture is maintained at about 115° C. with return of refluxing solvent for about 1 hour, at which time 233.2 parts of butyl cellosolve are added and the mixture is cooled to room temperature. This resin solution is about 78.5% non-volatiles, has an acid number (based on non-volatiles) of about 4.28 and, after dilution with an equal quantity of butyl cellosolve, a viscosity of G on the Gardner-Holt scale, the viscosity solution being slightly cloudy.

EXAMPLE II

A binder resin substantially identical to that of Example I can be produced without requiring the removal of solvent by starting with a liquid diepoxide of lower molecular weight, such as the diglycidyl ether of bisphenol A, and first producing a higher molecular weight diepoxide therefrom by reacting 2 moles of the liquid diepoxide with 1 mole of bisphenol A in the presence of a conventional amine or triphenyl phosphine catalyst, all in the absence of solvent.

Specifically, charge to a suitable reaction vessel 2713 parts of Dow Chemical Company liquid diepoxide D.E.R. 333, having molecular weight of about 350 and containing catalyst, and 787 parts of bisphenol A. Heat to about 140° C. and permit the reaction exotherm to raise the temperature to about 180° C. Hold at 180° C. for about 2 hours until the viscosity of a sample diluted 1:1 with butyl cellosolve is in the range H-J on the Gardner-Holt scale and the oxirane value is in the range about 3.1 to 3.3. Cool and dilute with 937 parts butyl cellosolve. Place 1331 parts of the diepoxide resin solution so produced in a suitable reaction vessel, heat to 130° to 140° C., add 157.5 parts of diethanolamine and 99 parts of nonylphenol over about 2 hours, and hold at about 135° C. for about 2 hours until the oxirane value is reduced to about 0. Then reduce the temperature to about 115° C. and add 644 parts of an 85% solution in isobutanol of the American Cyanamid acid functional etherified melamine resin designated CLA-66. Hold at the temperature for about 1 hour until the viscosity of a sample diluted 1:1 with butyl cellosolve is about G to H on the Gardner-Holt scale. The acid number of this resin was about 5 and the reaction product about 80.7% non-volatiles.

EXAMPLE III

In place of the acid functional melamine ether of Examples I and II may be substituted an acid functional benzoguanamine ether, which can be made as follows. Place in a suitable reaction vessel 300 parts toluene, 1220 parts paraformaldehyde, 4560 parts-n-butanol and 30 parts hexamethylenetetramine (as catalyst). Heat to reflux (about 110° C.) for 1 to 2 hours until a clear solution is formed. The pH will be about 7 to 7.5. Add 1870 parts benzoguanamine and hold the temperature at about 105° C. until the solution is again clear. The pH will be about 8 to 8.6. Cool to 80° C. and add about 8 parts maleic anhydride to give a pH of 4.3 to 4.7. Heat to reflux and distill off a water-containing azeotrope over a period of about 6 to 12 hours, removing about 650 parts of water, until the mineral spirits tolerance is at least about 60. The mineral spirits tolerance is the milliliters of mineral spirits that, mixed with 10 g. of sample, makes the mixture just cloudy enough that an ordinary laboratory thermometer becomes not clearly legible when viewed through the mixture contained in a 250 ml. beaker. Then distill under vacuum to remove about 2,800 to 2,900 parts of solvent, the temperature remaining below about 105° C. The intermediate product so formed is about 96.4% nonvolatiles, has a Gardner-Holt viscosity of about Z6 to Z7, and an acid number of about 0.8.

Heat 500 parts of this intermediate product together with 39 parts salicyclic acid and 76 parts butyl cellosolve at about 130° C. for about 1 to 3 hours until the viscosity is about Z7 to Z8 to form the desired butylated acid-functional benzoguanamine resin. This product will be about 76.4 nonvolatiles and will have an acid number of about 14, based on nonvolatiles.

This and similar acid functional benzoguanamine ethers may be substituted for melamine derivatives as the aminoplast resin in any of the electrocoating compositions or processes and will have superior resistance to premature reaction and/or gelation in the acidic aqueous composition. However, because the cost is higher than melamine derivatives, the melamine derivatives will usually be selected for large volume uses.

EXAMPLE IV

The amino epoxy binder resin may be incorporated in the aqueous electrocoating formulation without pre-reaction with the aminoplast resin and it is usually preferred that the pigment be ground with a portion of the binder resin in aqueous dispersion in the absence of any aminoplast resin before mixing with further dispersed binder resin and aminoplast resin to form the aqueous electrocoating composition. Suitable procedures for making such binder resins comprise adapting the procedures of Examples I and II to omit the introduction of aminoplast resin.

As a specific example, in a suitable reaction vessel heat 536 parts of diethanolamine to about 130° C. and, while maintaining the temperature at about 130° to 140° C., add 4764 parts of Dow Chemical Company diepoxide resin solution (75% in xylene) D.E.R. 671X75 over a period of about 3 hours. Hold the reaction mixture in that temperature range for an additional hour and then add 337 parts of nonylphenol over about one-half hour. Maintain the temperature for about 2 more hours until the oxirane value is about 0. Distill off about 900 parts of solvent as the temperature is gradually increased to about 150° C. and then a vacuum is gradually applied. Finally add 1111.5 parts butyl cellosolve and cool to room temperature. This resin solution is about 78.7% nonvolatiles and has a viscosity of about J.

EXAMPLE V

The required pendant hydrocarbon group can be incorporated by reacting a suitable hydrocarbon monoepoxide with a hydroxyl group on the epoxy resin. In the present example it is thought that this reaction involves a primary hydroxyl on the diethanol amine group rather than a secondary hydroxyl on the epoxy chain.

Heat 210 parts diethanolamine in a suitable reaction vessel to about 130° C. and, while maintaining that temperature, add 1400 parts D.E.R. 671X75 diepoxide resin solution (75% in xylene) over a period of about 3 hours. Hold at that temperature for about 2 hours, then add 140 parts alpha-Olefin Epoxide 14–16, a Union Carbide Corporation product having the structure

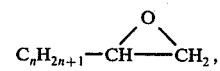

$n = 14$ to 16, and continue maintaining the temperature at about 130° C. for about 2 to 3 hours until the oxirane value is reduced to about 0. Distill off under vacuum substantially all the xylene, add 355 parts butyl cellosolve, and cool. This binder resin solution is about 79.8% nonvolatiles, has an acid number of about 0, and a viscosity of about I to J upon 1:1 dilution with butyl cellosolve.

EXAMPLE VI

The required pendant hydrocarbon group may be attached to the binder resin by an ester linkage if the hydrocarbon group pendant from the carboxyl carbon is a tertiary hydrocarbon so that the ester group is resistant to hydrolysis. Versatic acid is a suitable commercially available acid and its glycidyl ester is available from Shell Chemical Company as a product designated as Cardura E.

As a specific example, heat 420 parts diethanolamine in a suitable reaction vessel to about 130° C., add 2800 parts D.E.R.671X75 Dow Chemical Company diepoxide resin solution over about 2 hours and maintain the temperature for about another 1 to 2 hours until the oxirane value is about 0. Then add about 245 parts Cardura E and hold at about 130° C. for about 2 to 3 hours until the oxirane value is again reduced to about 0. Distill under vacuum to remove about 600 parts xylene, add 691 parts butyl cellosolve and cool.

This binder resin solution is about 79.9% nonvolatiles, has an acid number of about 0 and a viscosity (diluted 1:1 with butyl cellosolve) of about G to H.

EXAMPLE VII

By a procedure similar to that of Example I a binder resin partially reacted with an acid functional etherified melamine resin of lower acid number can be produced. A particularly suitable amino resin for use where an aminoplast resin of lower acid number is desired is a butylated hexamethoxy melamine partially etherified with an aromatic carboxylic acid. The American Cyanamide Company product designated CLA-115 is such an aminoplast resin (85% in isobutanol) having an acid number of about 13.7.

Heat 157.5 parts diethanolamine in a suitable reaction vessel to about 130° C., add 1400 parts D.E.R.671X75 diepoxide resin solution (75% in xylene) over a period of about 2 hours and hold at that temperature for about one additional hour. Then add 90 parts nonylphenol and maintain the temperature for about 2-3 hours until the oxirane value is about 0. Distill off about 320 parts solvent under vacuum while raising the temperature gradually to about 150° C. Reduce the temperature to about 115° C., add 668 parts CLA-115, and maintain this temperature for about 1 hour. Add 358.6 parts butyl cellosolve and cool to room temperature. This binder resin-/aminoplast resin solution is about 78.5% nonvolatiles, has an acid number of about 2.9 (based on nonvolatiles) and a viscosity (diluted 1:1 with butyl cellosolve) of about H.

While the electrocoating compositions of the present invention can be used without pigment so as to form clear coatings, ordinarily these compositions will include conventional pigmentation. Because of the superior corrosion resistance and in particular resistance to detergent solutions, the use of these compositions will be further illustrated in formulations containing conventional pigmentation for gray appliance primer coatings.

EXAMPLE VIII 445 parts of the aminoplast-free binder resin solution of Example IV, 36 parts hexyl cellosolve, 36 parts lactic acid, and 1083 parts deionized water are mixed together to form a pigment grind vehicle. 482 parts of this grind vehicle, 54 parts butyl cellosolve, 79 parts deionized water, 104 parts fine particle kaolin clay, 271 parts rutile titania, 5 parts furnace black, and 5 parts non-ionic surfactant defoamer are mixed together in conventional pigment paste grinding apparatus and 2.5 parts lactic acid are then added thereto and the resulting mixture ground to a Hegeman fineness of about 1½ to 7 to form a pigment grind paste. In a separate container are mixed together 229 parts of the partially pre-reacted binder resin/aminoplast resin solution of Example I, 18 parts hexyl cellosolve, 18 parts lactic acid, and 235 parts deionized water. To this mixture add 124 parts of the pigment grind paste and 1520 parts of deionized water to form an electrocoating dispersion composition having about 12% nonvolatiles and a pH of about 4.2 to 4.4.

EXAMPLE IX

Coatings can be deposited from the aqueous electrocoating composition of Example VIII in conventional electrocoating apparatus by connecting the workpiece substrate to be coated as the cathode electrode and maintaining a voltage of about 150 volts between the workpiece cathode and the counterelectrode with the liquid electrocoating dispersion maintained at a temperature of about 70° F. Under these conditions a final coating thickness of about ½ mil is deposited in about 90 seconds. The coatings so deposited can be baked at about 375° F. for about 20 minutes to give hard, tough, adherent cured coatings. On either galvanized steel or cold rolled steel substrates these cured coatings provide exceptional resistance to corrosion of the substrate when exposed to either salt spray or detergent solutions.

In continuous operation, the electrodepositable components of the electrocoating dispersion must be periodically or continuously replaced. It is preferable that this be done with a high solids, low acid replacement feed composition in order to minimize the build-up of solubilizing acid and of water in the bath and the consequent requirement that such excess acid and/or water be removed by ultrafiltration, reverse osmosis or similar well-known techniques.

EXAMPLE X

A suitable replacement feed composition for use in conjunction with the bath composition of Example VIII can be made by mixing together 205 parts of the binder resin/aminoplast resin solution of Example I, 16 parts of hexyl cellosolve, 5 parts lactic acid, 8 parts denatured alcohol, and 31 parts deionized water and mixing that solution with 104 parts of the pigment grind paste of Example VIII. This replacement composition is about 61% nonvolatiles and should be added to the 12% bath composition of Example VIII either intermittently or continuously so as to approximately replace the components depleted from the bath during its use in an electrocoating process.

What is claimed is:

1. A cathodic electrocoating composition comprising, in aqueous dispersion:
    (a) a cathodically electrodepositable, at least partially cationized binder resin comprising a major proportion by weight of a reaction product of a 1,2-epoxide-functional resin and a monoamino alcohol having at least one reactive hydrogen on the amino nitrogen, said reaction product being substantially devoid of reactive epoxide groups and having an average of at least about two reactive hydroxyl groups and an average of at least about ½ directly or indirectly pendant 5 to 20 carbon atom hydrocarbon radical per molecule;
    (b) from about 0.05 to about 1 weight parts, per weight part of said binder resin, of an acid-functional aminoplast resin (i) cathodically co-electrodepositable with said binder resin from said aqueous dispersion to form an intermediate product comprising an intimate mixture of the cathodically electrodeposited forms of said binder resin and said aminoplast resin, (ii) co-reactive in said intermediate product with the cathodically electrodeposited form of said binder resin, upon heating, to transform said intermediate product into a cured resinous product, (iii) having at least about 0.0001 equivalent of titratable acid functionality of $pK_a$ not greater than about 5 per gram of said aminoplast resin, and (iv) not soluble in the aqueous medium of said dispersion, and
    (c) from about 20 to about 150 milliequivalents, per 100 grams of (a) and (b), of an anion of a water-soluble acid to enhance and stabilize the cationization of said binder resin;

said aqueous dispersion having a pH of from about 2 to about 7 and being substantially free of any water-soluble acid which will be retained in water-soluble form in said cured resinous product and of anions thereof.

2. The composition of claim 1 wherein said hydrocarbon radical is attached to said reaction product by an ether linkage or by an ester linkage, provided that the hydrocarbon radical is a tertiary radical on the carboxyl carbon atom of said ester linkage.

3. The composition of claim 1 wherein said monoamino alcohol is a dialkanol amine in which each alkanol group has from 2 to 5 carbon atoms.

4. The composition of claim 1 wherein said epoxy resin comprises a major proportion by weight of the reaction product of a diepoxide reaction product of bisphenol A and epichlorohydrin having an average molecular weight from about 500 to about 2,500 and from about ½ to about 1 mole of a monohydroxyl alcohol or phenol having from 5 to 20 carbon atoms per mole of said diepoxide.

5. The composition of claim 4 wherein said monoamino alcohol is a dialkanol amine in which each alkanol group has from 2 to 5 carbon atoms.

6. The composition of claim 5 wherein said monohydroxyl alcohol or phenol is an alkylphenol in which the alkyl group has from 8 to 10 carbon atoms and wherein said monoamino alcohol is diethanol amine.

7. The composition of claim 1 wherein said anion of a water-soluble acid is the anion of lactic acid.

* * * * *

UNITED STATES PATENT AND TRADEMARK OFFICE
CERTIFICATE OF CORRECTION

PATENT NO. : 4,119,599
DATED : Oct. 10, 1978
INVENTOR(S) : James T. K. Woo and James M. Evans It is certified that error appears in the above-identified patent and that said Letters Patent are hereby corrected as shown below:

| | |
|---|---|
| Col. 2, l. 18 | "now" should be changed to read --not--. |
| Col. 7, l. 15 | "5,6" should be changed to read --5.6--. |
| Col. 9, l. 6 | "the" should be changed to read --that--. |
| Col. 11, l. 17 | "90" should be changed to read --99--; |
| l. 50 | "1-1/2" should be changed to read --6-1/2--. |

Signed and Sealed this

Sixth Day of February 1979

[SEAL]

Attest:

RUTH C. MASON
Attesting Officer

DONALD W. BANNER
Commissioner of Patents and Trademarks